No. 639,531. Patented Dec. 19, 1899.
J. S. COPELAND.
REAR BRACKET FOR BICYCLE FRAMES.
(Application filed June 23, 1897.)
(No Model.) 2 Sheets—Sheet 1.

Witnesses: Arthur B. Jenkins, William H. Barker.

Inventor: James S. Copeland, By Chas. L. Burdett, Attorney.

No. 639,531. Patented Dec. 19, 1899.
J. S. COPELAND.
REAR BRACKET FOR BICYCLE FRAMES.
(Application filed June 23, 1897.)
(No Model.) 2 Sheets—Sheet 2.
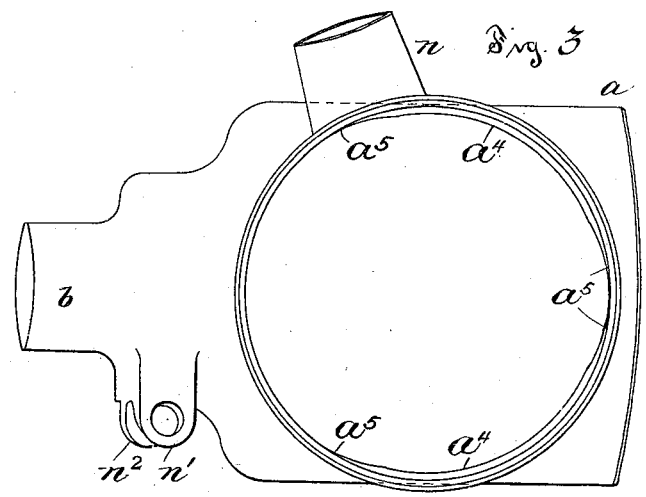
Fig. 4
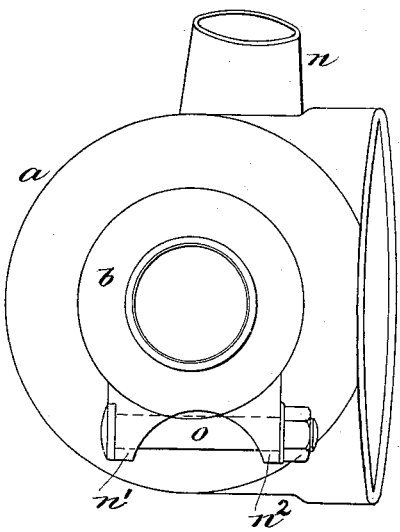
Fig. 5
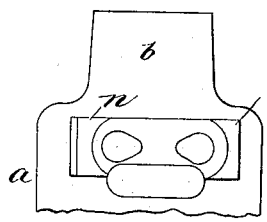
Witnesses
Arthur B. Jenkins.
William H. Barker.
Inventor
James S. Copeland,
by Chas. L. Burdett,
Attorney.

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

REAR BRACKET FOR BICYCLE-FRAMES.

SPECIFICATION forming part of Letters Patent No. 639,531, dated December 19, 1899.

Application filed June 23, 1897. Serial No. 641,976. (No model.)

*To all whom it may concern:*

Be it known that I, JAMES S. COPELAND, a citizen of the United States, and a resident of Hartford, in the county of Hartford and State of Connecticut, have invented certain new and useful Improvements in Rear Brackets for Bicycle-Frames, of which the following is a full, clear, and exact description, whereby any one skilled in the art can make and use the same.

My invention relates more particularly to a bracket adapted for use in a bevel-gear-mechanism form of driving means for a bicycle or velocipede and is directly appurtenant to the rear end of the frame at the part where the driving-wheel axle is supported.

The object of my invention is to provide a bracket which shall support and inclose a part of the driving mechanism of the vehicle and at the same time form a rigid connection between the parts.

To this end my invention consists in the combination of the several parts making up the bracket and connected parts and in details of such parts, as hereinafter described, and more particularly pointed out in the claims.

Figure 1:
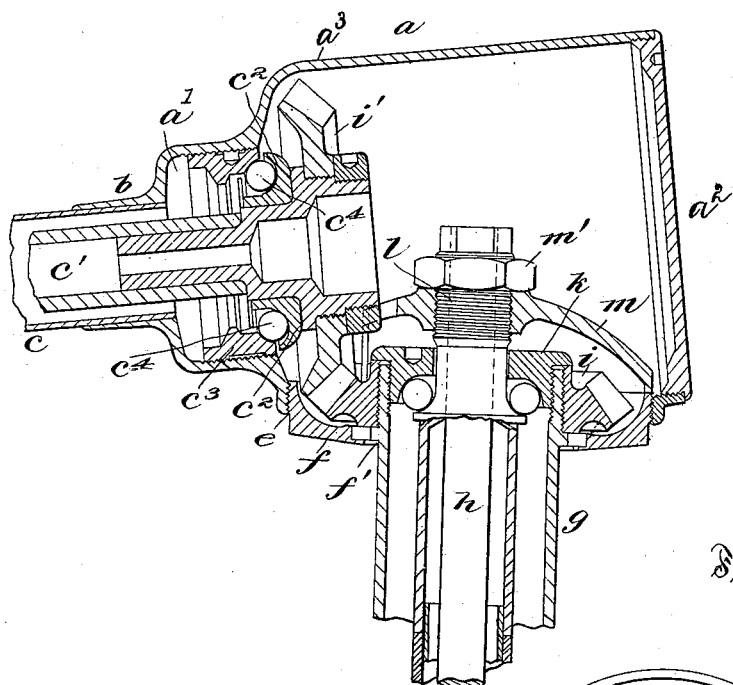
Figure 2:
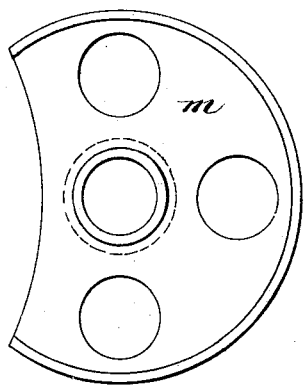
Figure 6:
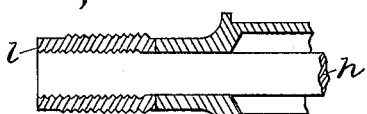
Figure 7:
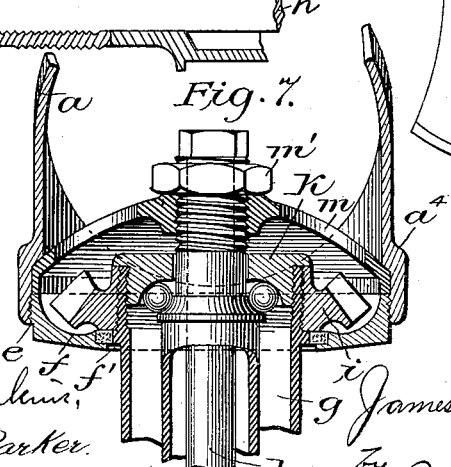

Referring to the drawings, Figure 1 is a detail view, in horizontal section, through the bracket and part of the shaft ends. Fig. 2 is a view in elevation of the anchor-plate. Fig. 3 is a view in side elevation of the bracket with the cap removed. Fig. 4 is a front view of the same. Fig. 5 is a bottom view of the front end of the bracket and the clamping-lugs. Fig. 6 is a detail view in section through the sleeve. Fig. 7 is a detail view, in vertical section, through the rear bracket on a plane passing through the axis of the rear driving-wheel, part of the bracket being broken away.

In the accompanying drawings the letter $a$ denotes a bracket which is substantially cylindrical in general outline and having an opening therethrough, the front end of the bracket being reduced in diameter to more closely conform to the size of the frame-tube $c$, to which the bracket is secured at that part.

In the preferred form of the invention the bracket is made in two sections $a^2$ $a^3$, the section $a^2$ forming a removable cap secured in place by any convenient means, but preferably such as to enable a joint to be provided which is tight enough to prevent the leakage of oil or other lubricant from within the bracket. In the form herein shown the section $a^2$ consists of a cap closing the end of the bracket; but it is obvious that this section may embody a greater or lesser part of the bracket and yet come within the scope of my invention.

A circular opening $e$ is provided on the inner side of the bracket, and in this opening a ring $f$ is firmly secured by any convenient means, but preferably by interengaging threaded parts on the periphery of the ring and the adjacent inner surface of the wall of the opening. Through an opening $f'$ in this ring the hub $g$ of the rear driving-wheel extends, and within this hub in the form shown the driving-axle $h$ is supported on suitable bearings. A bevel gear-wheel $i$ is screwed onto this end of the hub, the projecting flange of the ball-case $k$ overhanging the outer end of the hub of the gear-wheel and forming a check-nut, which prevents the loosening of the gear, which is thus held between a shoulder on the barrel and the overhanging flange on the ball-case. The axle $h$ extends within a sleeve $l$, which is located within the bracket and is threaded so as to engage a threaded opening in the anchor-plate $m$. This anchor-plate rests upon shoulders $a^4$, formed by boring the hole $e$ through the bracket. The edges of the anchor-plate lie against the walls of the opening $e$, preventing lateral movement, and the ring $f$, screwed into this opening, holds the anchor-plate firmly against its seat on the shoulders $a^4$. This anchor-plate has a small portion removed on one side, so as to allow the gear-wheels on the driving-wheel axle and on the connecting-rod to intermesh, and the edge of the anchor-plate fits against the inner surface of the ring $f$, on which it has an even bearing. A lock-nut $m'$ secures the anchor-plate to the sleeve in such manner as to prevent the accidental working loose of the parts.

The connecting-shaft $c'$ extends through the side tube $c$ of the frame and on its end supports a bevel-gear $i'$, which is in mesh with the bevel-gear $i$. This inner end of the tube of the connecting-shaft $c'$ has a shoulder $c^2$, which supports or forms the cone for the ball-bearing, and in a socket $a'$, formed in a reduced part of the bracket, is located an adjustable case $c^3$, the balls $c^4$ being located between this case $c^3$ and the cone. The bevel gear-wheel $i'$ is secured to the end of the connecting-shaft by any convenient means, preferably interengaging threaded parts on the end of the shaft and the inner surface of the hub of the gear-wheel, supplemented by a nut screwed upon a threaded portion of the end of the shaft outside of the gear-wheel hub.

The down-tube of the bicycle-frame is secured to a lug $n$ or to the wall of the bracket at this point, so that a rigid connection between the side tube and the down-tube is formed. At that part of the bracket directly opposite to the location of the ball-case $c^3$ there are integral projecting lugs $n'$ $n^2$, between which the metal is cut away and the wall of the bracket reduced in thickness very materially and may or may not be cut through. A bolt $o$ extends through openings in each lug, and by means of a nut pressure can be exerted to tend to draw the lugs toward each other. In practice it is found that a sufficient compressing force can be exerted by these means to reduce the walls of the bracket in diameter and securely clamp the ball-case in position and prevent its accidental movement.

The ring $f$, secured in the side opening in the bracket in the form of device shown, serves not only as a means for holding the anchor-plate $m$ firmly to its seat, but also as the supporter for a dust-cap and is a convenient filling-piece to close the space between the periphery of the hub of the wheel and the wall of the opening through the side of the bracket.

It is obvious that other means for holding the anchor-plate within the bracket may be employed and yet come within the scope of my invention, and I do not desire to limit myself to the exact means herein shown and described.

I claim as my invention—

1. In combination in a bracket having a rear opening and a lateral opening, a removable cap, a ring secured in the lateral opening, an anchor-plate located within the bracket and an axle extending within the bracket and secured to the anchor-plate.

2. In combination with a hollow body part having an interior threaded socket, integral lugs projecting on the outer surface of the body part, the wall of which is cut away and reduced in thickness between the lugs, and a clamping-bolt extending between the lugs and forming means for drawing the lugs toward each other.

3. In combination in a bracket having a lateral opening, an anchor-plate secured within said opening, a ring for securing the anchor-plate in position, and an axle extending within the bracket and secured to the anchor-plate.

4. In combination with the body part of the bracket having a rear end opening and a lateral opening, a removable cap, an anchor-plate located within the bracket, means for securing the anchor-plate in position and an axle extending within the bracket and removably secured to the anchor-plate.

5. In combination with a sectional bracket having a lateral opening, a removable anchor-plate located within the bracket, means for holding the anchor-plate in position, and an axle extending within the bracket and removably secured to the anchor-plate.

6. In combination, a hollow bracket having a rear end opening, a lateral opening and a reduced front portion, a removable cap in the rear end, a ball-case socket in the front end, an anchor-plate within the bracket, and an axle extending within the bracket and secured to the anchor-plate.

7. In combination in a bracket having a lateral opening, an anchor-plate located within the opening, means for securing the anchor-plate in position, and an axle extending within the bracket and secured to the anchor-plate.

8. In combination in a bracket having a lateral opening and a shoulder, an anchor-plate located within the bracket and against said shoulder, means for securing the anchor-plate in position, and an axle extending within the bracket and secured to the anchor-plate.

9. In combination in a bracket having a lateral opening and a shoulder, an anchor-plate located within the bracket and against said shoulder, a ring for holding the anchor-plate in place, and an axle extending within the bracket and secured to the anchor-plate.

10. In combination with a sectional bracket having a lateral opening, an anchor-plate removably secured within the bracket, means for securing the anchor-plate in position, and an axle extending within the bracket and removably secured to the anchor-plate.

JAMES S. COPELAND.

Witnesses:
HARRIS E. HART,
HERMANN T. CUNTZ.